(No Model.) 2 Sheets—Sheet 1.
J. SCHWEIZER.
PIVOT LATHE.
No. 457,373. Patented Aug. 11, 1891.
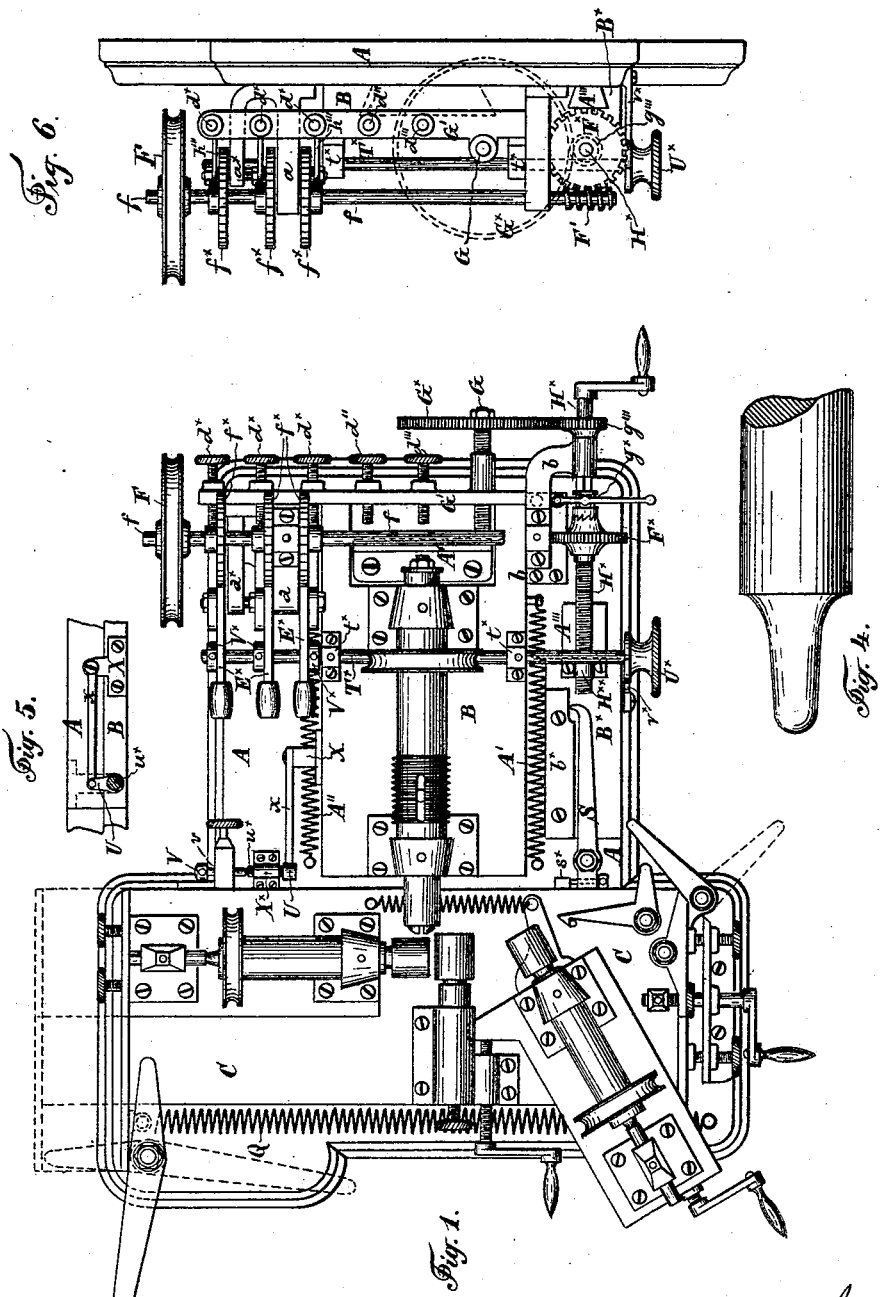
Witnesses
Harold Serrell
Chas N Smith
Inventor
Jakob Schweizer
per Lemuel W. Serrell
Atty (No Model.) 2 Sheets—Sheet 2.
J. SCHWEIZER.
PIVOT LATHE.
No. 457,373. Patented Aug. 11, 1891.
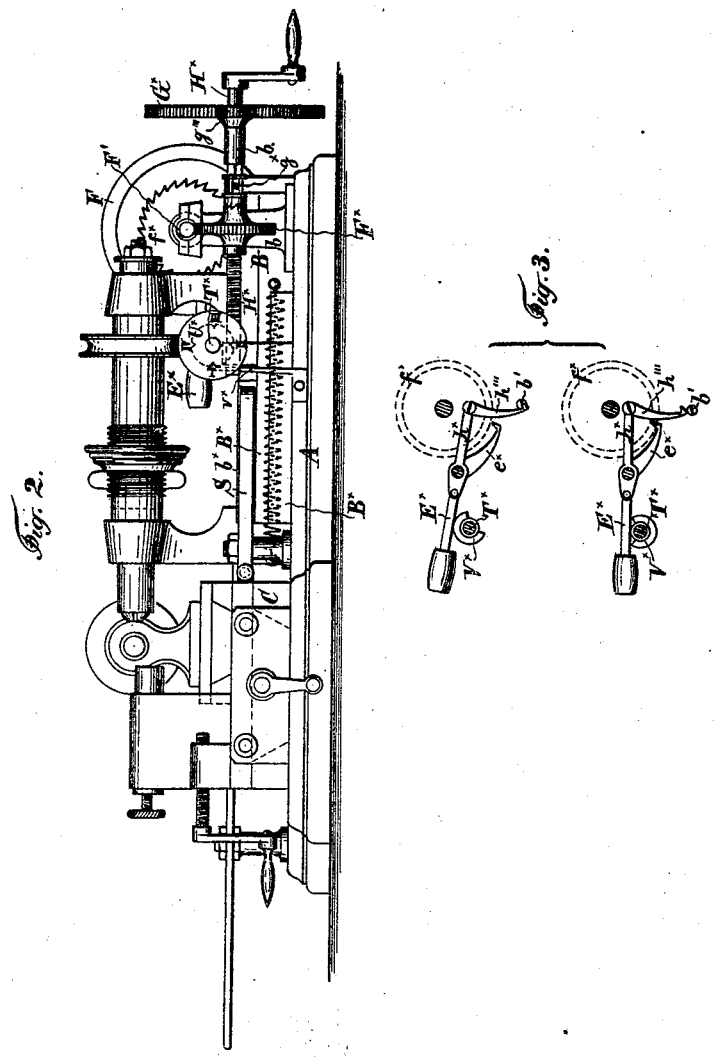

UNITED STATES PATENT OFFICE.

JAKOB SCHWEIZER, OF SOLEURE, SWITZERLAND, ASSIGNOR TO MÜLLER & SCHWEIZER, OF SAME PLACE.

PIVOT-LATHE.

SPECIFICATION forming part of Letters Patent No. 457,373, dated August 11, 1891.

Application filed April 6, 1891. Serial No. 387,726. (No model.)

*To all whom it may concern:*

Be it known that I, JAKOB SCHWEIZER, engineer, of Soleure, in Switzerland, have invented certain new and useful Improvements in Pivot-Lathes, of which the following is a specification.

The invention consists of certain new and useful improvements in pivot-lathes of the kind described in my United States patent, No. 446,211, dated February 10, 1891. The general features of my improved pivot-lathe being the same as described in my said patent, I will proceed to describe the new improvements claimed in the present application with reference to the said patent and to the accompanying drawings.

In the drawings accompanying the present application, Figure 1 is a plan view of the whole machine, in which the letters of reference are only indicated for those parts referred to in the following specification. Fig. 2 is a front elevation of the lathe. Fig. 3 shows separately the function of the levers $E^x$ with clicks $e^x$ and hooks $h'''$ and of the eccentrics $V^x$. Fig. 4 shows on an exaggerated scale the form of a pivot as it is, for instance, to be made on the lathe. Fig. 5 shows separately in elevation the function of the crank-lever U and tapped screw $u^x$. Fig. 6 is an elevation from right to left of the machine shown in Fig. 1.

In all the figures the same letters refer to the same pieces.

In my improved lathe the screw G of Patent No. 446,211 is shifted from its former position, but its purpose remains the same, and the worm F' of the driving-axis $f$ is situated at the end of the latter and drives the worm-wheel $F^x$, which is free to turn on the axis $H^x$, placed parallel to the screw G. The axis $H^x$ is supported by a bearing $b$, fixed to the base-plate A, and carries a pinion $g'''$, gearing with a wheel $G^x$, fixed upon the spindle G. The worm-wheel $F^x$ is connected to the screw-threaded portion of the axis $H^x$ by means of a coupling-box $g^x$, which allows the wheel $F^x$ to be disconnected from the screw $H^x$ when the latter, and with it the screw G, is to be stopped. The axis $f$, which carries the worm F', may also be stopped (by the means hereinafter described) when the screw G is to be stopped, as is necessary after each operation—that is to say, each time the operation of one of the tools is completed and another tool is to be put into operation, as explained in Patent No. 446,211. The stoppage may be effected by means of one of the ratchet-wheels $f^x$ on the axis $f$ and the pawls $e^x$, fixed to the levers $E^x$, which are pivoted to the bearings $a$ and $a^x$.

In view of increasing the number of successive operations which may be executed on the machine, I have replaced the two screws $d'$ and $d^x$ of the lathe shown in Patent No. 446,211 by three similar screws $d^x$, which cause the corresponding pawls $e^x$ to act successively upon the wheels $f^x$, as will be described below. (See Fig. 1.)

Each of the levers $E^x$ is provided with a counterbalance-weight tending to cause the corresponding pawl $e^x$ to fall into gear with the corresponding wheel $f^x$, this causing the instantaneous stopping of the axis $f$. Each of the levers $E^x$ is provided with an arm $h^x$, carrying a hook $h'''$, which occupies a position opposite to one of the screws $d^x$. These hooks $h'''$ engage automatically with the pins $b'$, projecting from the bearings $a$ or $a^x$ when the levers $E^x$ under the control of the screws $d^x$ are lifted—that is to say, when the carriage B is shifted sufficiently backward so that none of the screws $d^x$ are in contact with the hooks $h'''$. The lifting of the levers $E^x$ is effected by means of the eccentrics or cams $V^x$, which are fixed upon a transverse axis $T^x$, supported in bearings $t^x$ on the carriage B. The axis $T^x$ may be turned by means of a knob or button $U^x$ into four different positions, into each of which it is maintained by means of a spring $v^x$, whose head hooks into or engages with corresponding notches in the knob or button $U^x$. Each time the said spring $v^x$ engages into one of the three first notches of $U^x$ one of the eccentrics or cams $V^x$ has its depression turned upward, thus allowing the corresponding lever $E^x$ to fall and to stop the wheel $f'$ by means of its pawl $e^x$. (See Fig. 3.) The other eccentrics or cams $V^x$ present to their respective levers $E^x$ their raised portions, and thus prevent these latter falling. If the button $U^x$ be turned so as to cause the spring $v^x$ to engage with the fourth notch of the said button $U^x$, then the three eccentrics or cams $V^\times$ have their raised portions in contact with the levers $E^\times$, and consequently none of these levers $E^\times$ can fall. This position of the eccentrics or cams permits of the screws $d''$ and $d'''$ being operated, the levers, pawls, and hooks at this time being out of action. If the three levers E are in their raised position, as described above, and if the carriage B is shifted sufficiently far back, so that none of the screws $d^\times$ are in contact with any of the hooks $h'''$, the latter will automatically—that is to say, by means of their own weight—come into engagement with the pins $b'$. If the axis $T^\times$ is then turned, so that the first eccentric or cam $V^\times$ has its depression upward, and if while the axis $T^\times$ is in this position the screw $d^\times$ corresponding to the lever $E^\times$ comes against the hook $h'''$ by reason of the shifting of the carriage B, said hook $h'''$ will be disengaged from the pin $b'$, and that lever $E^\times$, which is above the first eccentric or cam $V^\times$, will fall and bring its pawl $e^\times$ into engagement with the corresponding wheel $f^\times$. This causes the axis $f$ to be stopped instantaneously and at the same time the worm $F'$ and wheel $F^\times$ and pinion $g'''$ and screw G are also stopped. The belt or cord driving the pulley F continuing to travel will slide upon and be unable to revolve said pulley until the the axis $f$ is again released. While the axis $f$ is at rest the carriage C is shifted, in the manner described in my patent, No. 446,211, so as to bring the tool into the working position for performing the second operation. The button $U^\times$ is then turned the distance of one notch, and the second eccentric or cam $V^\times$ will then bring its depression against its corresponding lever $E^\times$, and the first lever $E^\times$, having performed its office, is lifted so that its pawl $e^\times$ is out of reach of the corresponding wheel $f^\times$. The second lever $E^\times$ being in engagement with the pin $b'$ by means of its hook $h'''$ does not fall onto its eccentric or cam $V^\times$ until the second screw $d^\times$ comes against said hook $h'''$, as was the case with regard to the first screw $d^\times$. This releases the second lever $E^\times$ and effects another stoppage of the axis $f$ and screw G. The same operation will be repeated with regard to the third lever $E^\times$, and after these three similar operations have taken place the two last stoppages are effected by the screws $d''$ and $d'''$ in the same manner as described in the Patent No. 446,211. By this arrangement five automatic stoppages can be obtained, but of course in many cases only two or three will be necessary, according to the work to be done.

In place of employing the arm or pantographic lever S, (described in the Patent No. 446,211,) I may adopt the following pantographical arrangement, which permits of the production of various forms and is particularly useful in producing the rounded shoulder of pivots. (Shown on an exagerated scale in Fig. 4.) For this purpose I fix to the base-plate A a slide $A'''$, parallel with the slide of the carriage B, and upon this slide $A'''$ is a carriage $B^\times$, bearing a pattern, form, or model $b^\times$, representing on an enlarged scale the form which is to be turned on the work—say, for instance, the round part of the pivot shown in Fig. 4.

The carriage $B^\times$ carries a piece $H^{\times\times}$, provided with a tapped hole, into which screws the before-mentioned screw-threaded axis $H^\times$. By turning this latter in one direction the carriage $B^\times$ is shifted from left to right, and by turning it in the other direction the carriage $B^\times$ is shifted from right to left. This movement of the carriage $B^\times$ takes place at the same time as that of the carriage B, but as the screw G revolves slower than the screw $H^\times$ the carriage $B^\times$ moves faster in either direction than the carriage B. This difference in the rate of speed of the two carriages must be the same as the difference between the size of the patttern or model $b^\times$ and that of the work. The travel of the carriage B while the machine is, for instance, turning a pivot is so very small that it is not possible to make an exact pattern or model of the round portion which is to be produced on the pivot by means of the arm or pantographic lever S, described in my Patent, No. 446,211. The lever S is therefore pivoted to the base A and its long arm bears against the pattern or model $b^\times$, while its short arm carries a set-screw, against which bears the nose $s^\times$, forming part of the carriage C, the latter being acted upon, as in the first-described arrangement, by a spring Q.

The arrangement just described has the advantage of causing the shifting of the carriage C by means of a pattern or model, which represents on an enlarged scale the form to be produced on the work.

In some cases I substitute for the crank-lever U (shown in my Patent, No. 446,211) the following arrangement for producing on the pivots the very slight conicity usually given to the pivots by watch-makers. To the carriage B, Fig. 5, I affix a small support X, to which is hinged one end of a rod $x$, connected at its other end to a small crank U, fixed to a tapped screw $u^\times$. The latter is screwed through a projection $X^\times$ of the base A, and the screw V, traversing a projection $v$ on the carriage C, bears upon the extremity of the screw $u^\times$. According as the carriage B, carrying the work, is shifted from right to left, the rod $x$, acting upon the crank U, causes a partial rotation of the screw $u^\times$, and thereby a slight movement of the carriage C, which bears against said screw $u^\times$ under the action of the spring Q. The length of the crank U and the pitch of the thread of the screw $u^\times$ are calculated so as to obtain a very slight movement of the carriage C in proportion to the movement of the carriage B, in order to obtain for the work the desired conicity.

Having thus described my invention, I claim—

1. In pivot-lathes, the combination, with the axis $f$ and the ratchet-wheels $f^\times$, secured thereon, of the pivoted levers $E^\times$, the pawls $e^\times$ upon said levers, adapted to engage the wheels $f^\times$, the hooks $h'''$, also upon the levers $E^\times$, the fixed pins $b'$, adapted to engage the hooks $h'''$, and the eccentrics or cams $V^\times$, substantially as and for the purposes set forth.

2. The combination, in pivot-lathes, with the pantographic lever S and the carriage C, imparting pressure to said lever, of the screw G, its wheel $G^\times$, the pinion $g'''$, the screw-axis $H^\times$, its worm-wheel $F^\times$, and coupling-box $q^\times$, and the carriage $B^\times$, and pattern or model $b^\times$ carried thereby and against which the pantographic lever bears, substantially as and for the purposes set forth.

3. The combination, in pivot-lathes, with the carriage B, the support X, the rod $x$, the crank U, and screw $u^\times$, passing through the support $X^\times$, of the screw V and the carriage C, to which the screw V is connected, substantially as and for the purposes set forth.

In testimony whereof I have signed my name to this specification in the presence of two subscribing witnesses.

JAKOB SCHWEIZER.

Witnesses:
HENRY LABHARD,
PAULINA GNADIG.